(12) United States Patent
Neitzel et al.

(10) Patent No.: US 11,073,805 B2
(45) Date of Patent: Jul. 27, 2021

(54) PROCESS PLANT NETWORK WITH SECURED EXTERNAL ACCESS

(71) Applicant: FISHER-ROSEMOUNT SYSTEMS, INC., Round Rock, TX (US)

(72) Inventors: Lee A. Neitzel, Austin, TX (US); Dan H. Ussing, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 757 days.

(21) Appl. No.: 14/549,909

(22) Filed: Nov. 21, 2014

(65) Prior Publication Data

US 2016/0147206 A1    May 26, 2016

(51) Int. Cl.
*G05B 15/02* (2006.01)
*H04L 12/24* (2006.01)
(Continued)

(52) U.S. Cl.
CPC ............ *G05B 15/02* (2013.01); *H04L 12/462* (2013.01); *H04L 12/66* (2013.01); *H04L 41/08* (2013.01);
(Continued)

(58) Field of Classification Search
CPC .... G06F 11/324; G06F 11/3082; H04L 63/02; G05B 2219/31135; G05B 2219/33148
(Continued)

(56) References Cited

U.S. PATENT DOCUMENTS 8,155,761 B2   4/2012 Felts et al.
9,130,980 B2   9/2015 Law et al.
(Continued)

FOREIGN PATENT DOCUMENTS

CN    101035025 A    9/2007
CN    101495927 A    7/2009
(Continued)

OTHER PUBLICATIONS

"Firewall", Microsoft, 2009, whole document.*
(Continued)

*Primary Examiner* — Tonia L Dollinger
*Assistant Examiner* — Jonathan A Sparks
(74) *Attorney, Agent, or Firm* — Marshall, Gerstein & Borun LLP

(57) ABSTRACT

A process control system having an external data server that provides process control data to external networks via one or more firewalls implements a cost-effective security mechanism that reduces or eliminates the ability of the external data server to be compromised by viruses or other security attacks. The security mechanism includes a DMZ gateway disposed outside of the process control network that connects to an external data server located within the process control network. A configuration engine is located within the process control network and configures the external data server to publish one or more preset or pre-established data views to the DMZ gateway, which then receives the data/events/alarms as defined by the data views from the control system automatically, without performing read and write requests to the external data server. The DMZ gateway then republishes the data within the data views on an external network to make the process control data within the published data views available to one or more client applications connected to the external network. Because this security mechanism does not support client read, write, or configuration access to the external data server within the control system, this security mechanism limits the opportunity of viruses to use the structure in the DMZ gateway device to access the process control network.

38 Claims, 2 Drawing Sheets

(51) Int. Cl.
*H04L 29/06* (2006.01)
*H04L 12/66* (2006.01)
*H04L 12/46* (2006.01)

(52) U.S. Cl.
CPC ...... *H04L 63/0227* (2013.01); *H04L 63/0209* (2013.01); *H04L 63/0281* (2013.01); *H04L 63/145* (2013.01)

(58) Field of Classification Search
USPC .......................................................... 709/249
See application file for complete search history.

(56) References Cited

U.S. PATENT DOCUMENTS

| | | | |
|---|---|---|---|
| 2005/0149566 A1* | 7/2005 | Baek ................ | G06Q 10/06313 |
| 2007/0186011 A1* | 8/2007 | Batke ................ | H04L 41/0213 |
| | | | 709/246 |
| 2007/0283148 A1* | 12/2007 | Warman ............. | H04L 63/0209 |
| | | | 713/168 |
| 2008/0133651 A1 | 6/2008 | Bagci et al. | |
| 2008/0320127 A1* | 12/2008 | Fries ................. | H04L 63/0209 |
| | | | 709/224 |
| 2014/0047107 A1* | 2/2014 | Maturana ............ | H04L 43/04 |
| | | | 709/224 |
| 2014/0165182 A1 | 6/2014 | Curry et al. | |
| 2015/0058947 A1* | 2/2015 | John ................... | H04W 12/06 |
| | | | 726/7 |

FOREIGN PATENT DOCUMENTS

| | | |
|---|---|---|
| CN | 101877696 A | 11/2010 |
| CN | 101878668 A | 11/2010 |
| CN | 101963799 A | 2/2011 |
| CN | 102148827 A | 8/2011 |
| CN | 102299909 A | 12/2011 |
| GB | 2 386 531 A | 9/2003 |
| GB | 2 423 392 B | 4/2007 |
| JP | 2009-538016 A | 10/2009 |
| JP | 2013-162389 A | 8/2013 |

OTHER PUBLICATIONS

Great Britain Search Report for Application No. GB1520098.3, dated Jul. 12, 2016.
Honeywell Process Solutions, White Paper, "An Overview of Honeywell's Secure Remote Access to Process Control Systems," (2010). Retrieved from the Internet at: URL:http://www.honeywellprocess.com/library/marketing/whitepapers/SecureRemoteControltoProcessControlSystems.pdf.
Examination Report for Application No. GB1520098.3, dated Nov. 27, 2020.
Notice of Reasons for Rejection for Japanese Application No. 2015-227228, dated Apr. 7, 2020.
Notice of Reasons for Rejection for Japanese Application No. 2015-227228, dated Aug. 27, 2019.
Notification of First Office Action for Chinese Application No. 201510810657.9, dated Mar. 22, 2019.
Notification of Second Office Action for Chinese Application No. 201510810657.9, dated Dec. 10, 2019.
Notification of Third Office Action for Chinese Application No. 201510810657.9, dated Oct. 19, 2020.
Ohsako et al., "New Distributed SCADA Systems on Wide-Area IP Network," Toshiba Review, 63(4):10-13 (2008).

* cited by examiner

PROCESS PLANT NETWORK WITH SECURED EXTERNAL ACCESS

FIELD OF TECHNOLOGY

This application relates generally to process plant communications systems and, more particularly, to securing process plant control and maintenance systems while allowing for external access to data from these systems.

DESCRIPTION OF THE RELATED ART

Process control systems, such as distributed or scalable process control systems like those used in power generation, chemical, petroleum, or other manufacturing processes, typically include one or more controllers communicatively coupled to each other, to at least one host or operator workstation via a process control network and to one or more field devices via analog, digital or combined analog/digital buses. The field devices, which may be, for example valves, valve positioners, switches and transmitters (e.g., temperature, pressure and flow rate sensors), perform functions within the process or plant such as opening or closing valves, switching devices on and off and measuring process parameters. The controllers receive signals indicative of process or plant measurements made by the field devices and/or other information pertaining to the field devices, use this information to implement one or more control routines and then generate control signals which are sent over the buses or communication channels of the plant network to the field devices to control the operation of the process or plant. Information from the field devices and the controller is typically made available to one or more applications executed by the operator workstation to enable an operator or maintenance person to perform any desired function with respect to the process or plant, such as viewing the current state of the plant, modifying the operation of the plant, calibrating devices, etc.

During operation, the process controllers, which are typically located within the process plant environment, receive signals indicative of process measurements or process variables made by or associated with the field devices and/or other information pertaining to the field devices, and execute controller applications using this information. The controller applications implement, for example, different control modules that make process control decisions, generate control signals based on the received information, and coordinate with the control modules or blocks in the field devices such as HART® and FOUNDATION® Fieldbus field devices. The control modules in the process controllers send the control signals over the communication lines or other signal paths to the field devices, to thereby control the operation of the process.

Information from the field devices and the process controllers is typically also made available to one or more other hardware devices within or external to the plant, such as, for example, operator workstations, maintenance workstations, servers, personal computers, handheld devices, data or event historians, report generators, centralized databases, etc., via one or more secured process control networks. The information communicated over the process control networks enables an operator or a maintenance person to perform desired functions with respect to the process and/or to view the operation of the plant. For example, the control information allows an operator to change settings of process control routines, to modify the operation of the control modules within the process controllers or the smart field devices, to view the current state of the process or status of particular devices within the process plant, to view alarms and or alerts generated by field devices and process controllers, to simulate the operation of the process for the purpose of training personnel or testing the process control software, to diagnose problems or hardware failures within the process plant, etc.

The field devices and controllers usually communicate with the other hardware devices over one or more secured process control networks which may be, for example, implemented as an Ethernet-configured LAN. The process control network sends the process parameters, network information, and other process control data through various network devices and to various entities in the process control system. Typical network devices include network interface cards, network switches, routers, servers, firewalls, controllers, and operator workstations. The network devices typically facilitate the flow of data through the network by controlling its routing, frame rate, timeout, and other network parameters, but do not change the process data itself. As the process control network grows in size and complexity, the number and type of network devices correspondingly increases. As a result of system and network growth, security within and management of these complex systems is becoming increasingly difficult. As a start however, these networks are generally isolated from other external networks and are protected from external attacks by one or more firewalls.

In fact, in a typical industrial control system, the plant control system workstations/servers are strategically placed between external plant networks that perform various functions associated with the plant, and the embedded control devices that perform control and data acquisition functions (e.g. controllers, PLCs, RTUs) within the control system. As a result, a major security objective for the control workstations/servers is to prevent malware from entering the control system and adversely affecting the embedded devices, as well to prevent malware from changing the configuration and historical data stored in the plant process control databases. Still further, these workstations/servers prevent unauthorized access to the control system to prevent unauthorized changing of the plant configuration, unauthorized access to plant data, etc. While a number of security features, such as firewalls, "anti-virus" software and "white listing" can be used to address these security objectives, these security features are typically not sufficient. For example, anti-virus software cannot protect against "zero-day" viruses, and white listing only prevents unauthorized applications from running. In addition, some of these features are too intrusive to be operationally practical in a process control system because these security features have the potential to impede activities of plant operators.

In a general sense, malware, such as that at the heart of a zero-day attack, is typically introduced into the secured control system network via an authorized communications connection to an external network by operation of an application or a service that has the privilege or authorization to access the memory devices, network ports or direct data links within the process control network. Thereafter, the malware is able to be propagated to other devices (e.g., via communications) and/or to be executed within a device within the process control network using the security privileges of the applications or services that become infected with the malware. In addition, the malware may locally persist itself to allow it to be executed again after reboot of networked devices. In some cases, the malware may escalate the privileges of a host, e.g., an infected application or a service, using the privileges of the account under which the application or service is being executed and, in doing so, the malware may be able to perform actions or operations within the process control device or network that require a higher privilege, and are thus typically more detrimental to the control system operation. These attacks can have serious and potentially destructive or even deadly effects within a process plant when these attacks disrupt the on-going operation of the plant control system.

Thus, while it is desirable to isolate the process control network from other plant networks to limit the vulnerability of the process control network, it is also desirable and sometimes necessary to enable personnel to access process plant data or process control network data from a point external to the process control network (i.e., from outside of the firewall protecting the process control network). To enable such access, process control systems sometimes have an external data access server disposed within the firewall of the process control network that may make calls to the process control devices within the control system network to read process control system data, etc. and to send that data to the client devices within the external networks. This external data server may be accessible via one or more client applications which interface with the external data server from the external network via a firewall to obtain desired information from the process control network. As an example, the OPC Foundation publishes a set of OPC specifications that define programmatic interfaces that can be used by client applications located outside of a process control network firewall to access OPC servers located inside and connected to the secured process control network. These interfaces are defined in terms of the methods that can be called and the parameters that are passed between the OPC client and the OPC server. These interfaces typically provide configuration, browse, read, write, and callback access to runtime and historical data and events within the process control and manufacturing automation systems within the firewalls of the process control networks of a plant.

With the growing need to secure the connection between the process control or manufacturing automation systems and the other external (or internal) plant networks, plant architectures are increasingly providing buffer zones called DMZs between the plant control network and other plant systems. The DMZs typically include one or more servers or gateway devices that are tasked with interfacing with servers, such as external data servers like the OPC server, within a process plant network in a secure manner. In particular, in these systems, client applications located outside of the DMZ access the OPC server located within the process control system firewall via a DMZ gateway device, which provides access to the OPC server based on user authentication, etc. The client applications can then send configuration, browse, read, write, callback, etc. requests to the OPC server, via the DMZ gateways, causing the OPC server to access data within the plant network or control network and send that data or information to the client applications via the DMZ gateways. While the use of DMZs prevents direct connection between other plant or external workstations and the control system devices, experience has shown that the DMZ, if infected with malware, can be caused to provide direct connectivity to the control system from an external network, making it easier for the control system to be compromised. Therefore, the DMZ, when subject to malware attacks or viruses, may operate to expose the OPC server directly to the client applications or to other external devices through authorized connections, thereby defeating the firewall protection provided by the DMZ gateway devices, and subjecting the process control network to attack or compromise.

SUMMARY

A process control system having an external data server that provides process control data to external networks via one or more firewalls implements a cost-effective and secure mechanism that reduces or eliminates the ability of the external data server to be compromised by viruses or other security attacks originating from the external networks. Generally speaking, a process control network security system includes an external data server (that is located within a process control network) communicatively connected to a DMZ gateway device that is disposed outside of the process control network and is connected to an external network. A configuration engine that is used to configure the external data server is located within the process plant network firewall and thus operates from inside of the process control network. The configuration engine configures the external data server to produce one or more data sheets, data forms or data views that define data that is to be automatically obtained by the external data server from the process control network and to be published by the external data server at various times to the DMZ gateway device. The configuration engine also configures the DMZ gateway device to receive the published data views and to republish these data views to one or more clients or client applications connected to the DMZ gateway device via the external network.

After being configured, the external data server accesses the data within the plant as specified by the data sheets or data views, and provides the data within the data sheets or data views to the DMZ gateway device. The DMZ gateway device than communicates with various client applications on the external network, wherein the client applications subscribe to various ones of the data sheets or data views at the DMZ gateway device. In doing so, the client applications operate to automatically receive the data within the data sheets or data views as provided to the DMZ gateway device by the external data server. While the client applications can subscribe to one or more data sheets or data views within the DMZ gateway device, the DMZ gateway device is configured or implemented to ignore or not support browse, read, write and configuration calls from the client applications. Moreover, the external data server is also configured or implemented to ignore or not support browse, read, write and configuration calls from the DMZ gateway device. In one case, the read, write and configure ports of the external data server at the firewall side of the external data server are blocked or shut down to prevent external access via these ports. In this manner, the DMZ gateway device is not able to access data via the external data server other than the data provided by the external data server according to the data sheets or data views, which are configured from within the plant control network. As a result, even if the DMZ gateway device is subjected to a virus attack or is accessed by unauthorized personnel, the virus or unauthorized personnel will not be able to use the DMZ gateway device to gain access to the control system or process control network via the external data server because the DMZ gateway device has no direct ability to issue requests into the control system via the external data server.

The use of these security mechanisms leads to a software and communication environment within a process control system or process plant that is less susceptible to virus attacks, such as zero-day virus attacks, and other malware, as these security mechanisms make it difficult, if not impossible, for an infected or compromised DMZ gateway device to gain access to the process control system via an external data server and for an infected or compromised external client application to gain access to the DMZ gateway device.

DESCRIPTION

Figure 1:
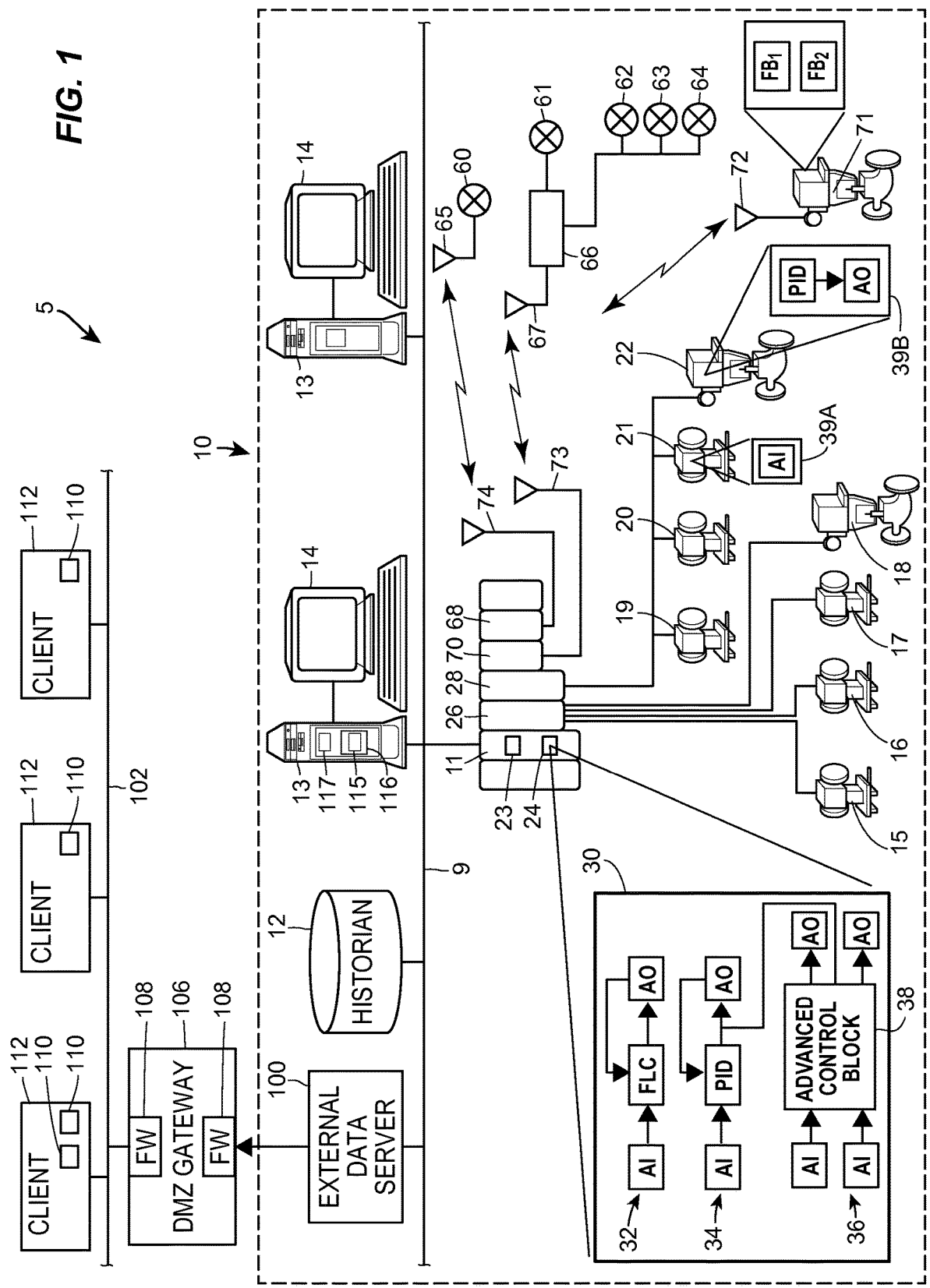
FIG. 1 is an exemplary diagram of a process plant having a distributed process control system and process automation network including one or more operator and maintenance workstations, servers, controllers, field devices, and including an external data server configured to provide secured external access to the control system from an external network.

FIG. 1 is a schematic representation of a process plant 5 including a process control network 10 (indicated as being inside of the dotted line of FIG. 1) and one or more other plant networks (indicated as being outside of the dotted line of FIG. 1). The process control network 10 may be disposed within, for example, a process plant, in which various computer devices may be used to implement the security features described herein to facilitate secured external access to process control system information within the process control network 10. As illustrated in FIG. 1, the process control network 10 includes a process controller 11 connected, via a process control data bus 9, to a data or event historian 12 and to one or more host workstations or computers 13 (which may be any type of personal computers, workstations, etc.), each having a display screen 14. The data or event historian 12 may be any desired type of data collection unit having any desired type of memory and any desired or known software, hardware or firmware for storing data. The data bus 9 may be, for example, a secured communication network such as a local area network implemented as, for example, an Ethernet communication link. The controller 11 is also connected to field devices 15-22 via input/output (I/O) cards 26 and 28 and process control field device networks or lines. The controller 11 is, in FIG. 1, communicatively connected to the field devices 15-22 using a hardwired communication network and communication scheme.

Generally, the field devices 15-22 may be any types of control devices, such as sensors, valves, transmitters, positioners, etc., while the I/O cards 26 and 28 may be any types of I/O devices conforming to any desired communication or controller protocol including, for example, 4-20 ma protocols, HART® protocols, FOUNDATION® Fieldbus protocols, etc. The controller 11 includes a processor 23 that implements or oversees one or more process control routines (or any module, block, or sub-routine thereof) stored in a memory 24 and the controller 11 communicates with the devices 15-22, the host computers 13 and the data or event historian 12 to control a process in any desired manner. Moreover, in one example, the controller 11 may implement one or more control strategies or schemes using what are commonly referred to as function blocks, wherein each function block is an object or other part (e.g., a subroutine) of an overall control routine that operates in conjunction with other function blocks (via communications called links) to implement process control loops within the process control network 10. Function blocks typically perform one of an input function, such as that associated with a transmitter, a sensor or other process parameter measurement device, a control function, such as that associated with a control routine that performs a PID, an MPC, a fuzzy logic, etc., control technique, or an output function which controls the operation of some device, such as a valve, to perform some physical function within the process plant or the process control system implemented using the process control network 10. Of course, hybrid and other types of function blocks exist and may be utilized in the example process plant of FIG. 1. The function blocks may be stored in and executed by the controller 11 or other devices in any desired or known manner.

As illustrated by the exploded block 30 of FIG. 1, the controller 11 may include a number of single-loop control routines, illustrated as control routines 32 and 34, and, if desired, may implement one or more advanced control loops, illustrated as a control loop 36. Each such control loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may implement any type of multiple-input, multiple-output control scheme, and/or may implement a process model based control routine, and thus may constitute or include a model predictive control (MPC) block, a neural network modeling or control block, a multi-variable fuzzy logic control block, a real-time-optimizer block, etc.

It will be understood that the function blocks illustrated in FIG. 1, including the advanced control block 38, can be executed by the stand-alone controller 11 or, alternatively, can be located in and executed by any other processing device or control element of the process control system 10, such as one of the workstations 13 or one of the field devices 19-22. As an example, the field devices 21 and 22, which may be a transmitter and a valve, respectively, may execute control elements for implementing a control routine and, as such, include processing and other components for executing parts of the control routine, such as one or more function blocks. More specifically, the field device 21 may have a memory 39A for storing logic and data associated with an analog input block, while the field device 22 may include an actuator having a memory 39B for storing logic and data associated with a PID, an MPC or other control block in communication with an analog output (AO) block, as illustrated in FIG. 1.

Moreover, the control system 10 illustrated in FIG. 1 includes a number of field devices 60-64 and 71 that are wirelessly communicatively coupled to the controller 11 and potentially to one another. As illustrated in FIG. 1, the wirelessly connected field device 60 is communicatively connected to an antenna 65 and cooperates to communicate wirelessly with an antenna 74 which is, in turn, coupled to a wireless I/O device 68 connected to the controller 11. Moreover, the field devices 61-64 are connected to a wired-to-wireless conversion unit 66 which is, in turn, communicatively connected to an antenna 67. The field devices 61-64 communicate wirelessly through the antenna 67 with an antenna 73 connected to a further wireless I/O device 70 which is also connected to the controller 11. As also illustrated in FIG. 1, the field device 71 includes an antenna 72 which communicates with one or both of the antennas 73 and 74 to thereby communicate with the I/O devices 68 and/or 70. The I/O devices 68 and 70 are, in turn, communicatively connected to the controller 11 via a wired backplane connection (not shown in FIG. 1). In this case, the field devices 15-22 remain hardwired to the controller 11 via the I/O devices 26 and 28.

The process control system 10 of FIG. 1 may additionally use or incorporate the wireless transmission of data measured, sensed by or computed by the transmitters 60-64 or other control elements, such as the field device 71, in any desired manner. In the control system 10 of FIG. 1, new process variable measurements or other signal values may be transmitted to the controller 11 by the devices 60-64 and 71 on a scheduled or periodic basis or on a non-periodic or intermittent basis, such as when certain conditions are satisfied. For example, a new process variable measurement value may be sent to the controller 11 when the process variable value changes by a predetermined amount with respect to the last process variable measurement value sent by the device to the controller 11 or at least once per a predefined update rate that is typically much slower than the scan rate of the controller 11. Of course, other manners of determining when to send process variable measurement values in a non-periodic manner may be implemented as well or instead.

As will be understood, each of the transmitters 60-64 of FIG. 1 may also transmit signals indicative of respective process variables (e.g., flow, pressure, temperature or level signals) to the controller 11 for use in one or more control loops or routines or for use in a monitoring routine. Other wireless devices, such as the field device 71, may receive process control signals wirelessly, and/or be configured to transmit other signals indicative of any other process parameter. While the wireless devices of FIG. 1 are illustrated as being connected to the controller 11 via input/output devices 68 and 70, they could instead be connected to the controller 11 or any other controller via a gateway connected to the data bus 9, or in any other manner. Moreover, as will be understood, any of the data collected by or available to the controller 11 may be made available to and stored at or used by the workstations 13 and/or the data or event historian 12 via the data bus 9 associated with the process control network 10.

As also illustrated in FIG. 1, the process control network 10 includes an external data server 100 that communicatively connected to the data bus 9 and is thus disposed within the process control network 10. The external data server 100, which may be an OPC server that conforms to the well-known OPC protocol or standard, is connected to a second communications network 102 via a DMZ having one or more DMZ gateway devices 106. The second communications network 102 may be, for example, a further plant network, such as an Ethernet communications connection that implements TCP communications, for example, may be an internet connection to a public or open network, or may be any other type of external communications or computer network separated from the process control network 10.

The DMZ gateway device 106 connected to the external data server 100 is protected by one or more internal or external firewalls 108, which may be any type of firewalls that allows only authorized data flows, and may also perform other security functions such as intrusion security functions, etc. In the example of FIG. 1, the DMZ gateway device 106 connected to the external data server 100 includes a back end firewall 108 at the input of the gateway device 106 connected to the external data server 100 and a front end firewall 108 at the input of the gateway device 106 connected to the data bus (or other communication connection) 102. Of course, it will be understood that, while the buses or communication connections 9 and 102 are illustrated as wired connections, these communication connections could instead or additionally be implemented using wireless connections and wireless communication devices (e.g., wireless Ethernet, WiFi internet connections, etc.) or a combination of both wired and wireless communications and devices. Still further, as illustrated in FIG. 1, multiple client applications 110 executed in various client devices 112 may be connected to the DMZ gateway device 106 and may communicate with the DMZ gateway device 106 to obtain information from the process control network 10 in a secured manner.

Still further, as illustrated in FIG. 1, a configuration application (also called a resource manager) 115 is disposed within one of the processing devices, e.g., one of the workstations 13, within the process control network 10. The configuration application 115 is stored in a computer or non-transitory computer readable memory 116 and is executed on a processor 117 of the workstation 13 to configure the external data server 100 and, to some extent, the DMZ gateway device 106 as described in more detail below.

Generally speaking, during operation, the external data server 100 is configured from within the process control network 10 to obtain information from devices within the process control network 10 (e.g., from the data or event historian 12, the controller 11, the workstations 13, the field devices 15-22, 60-64 and 71, etc. via) the data bus 9 and provides this information to the one or more client applications 110 within the client devices 112 on the external network 102 in a manner that is secure in nature even if the DMZ gateway device 106 is attacked with malware that defeats or compromises the firewalls 108. Generally speaking, to implement a secured communication connection between the external data server 100 and the one or more client applications 110 within the client devices 112, the external data server 100 is set up or configured to publish to the DMZ gateway device 106 preset types or amounts of process control data (also called "data views" or data forms) with data obtained from or within the process control network 10. In this case, the data within the data views are then stored at and are provided by the DMZ gateway device 106 to the client applications 110 within the client devices 112 which may subscribe to any or all of the data views. Moreover, as part of this configuration, the external data server 100 is configured to only be able to publish data to the DMZ gateway device 106 according to (as defined by) the preset or pre-established data views and is not able to accept or perform read or write requests (commands) received from the gateway device 106 or to be configured from the DMZ gateway device 106. Thus, in one case, the read, write and configure endpoints or ports of the external data server 100 (on the DMZ gateway side of the server 100) are disabled so that the external data server 100 cannot accept or respond to read, write or configure requests provided by the DMZ gateway device 106. Importantly, the configuration application or configuration engine 115 for the external data server 100 is located within the process control network 10, such as within the external data server 100 itself, one of the workstations 13 or other computer or server that is connected within the process plant network 10. Thus, while the external data server configuration application 115 is illustrated in FIG. 1 as being located within one of the workstations 13 within the process control network 10, it could instead be located in any other processing device connected to the external data server 100 via the data bus 9 or other connection within the process control network 10. In this manner, the external data server 100 can only be configured from within the process control network 10.

Figure 2:
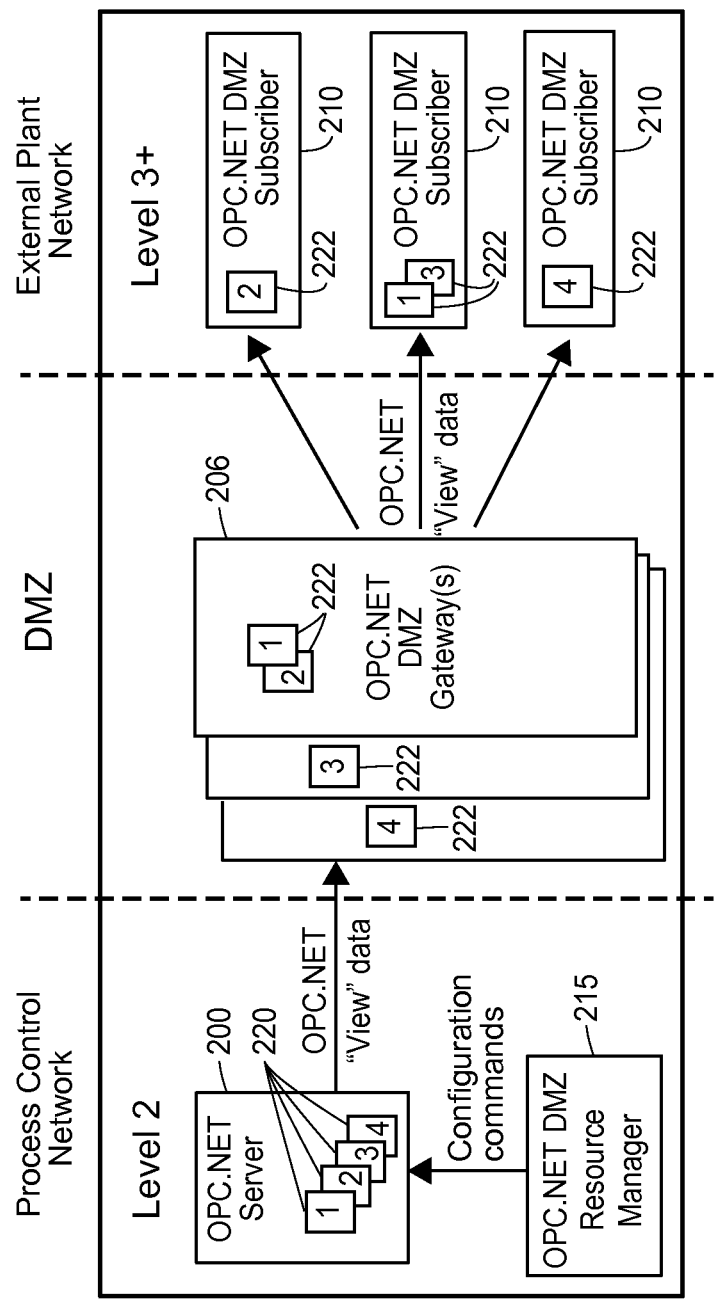
FIG. 2 is an exemplary block diagram of communication connections between an external data server within a process control network such as that of FIG. 1, a DMZ gateway device and one or more client devices which access data from the external data server via the DMZ gateway using a secured configuration described herein.

By way of further example, FIG. 2 illustrates a communication flow diagram that may be implemented using a configuration application 215, an external data server 200 (in this case illustrated as being an OPC.NET data server) disposed within a process control network, one or more DMZ gateway devices 206 disposed outside of the process control network and one or more client applications 210 within one or more client devices also disposed outside of the process control network but connected to the DMZ gateway device 206 via an external communications network. In particular, as illustrated in the example system of FIG. 2, the configuration engine 215, which may be the configuration engine 115 of FIG. 1, is implemented as a standard OPC.NET resource manager or configuration engine and is disposed, along with the external data server 200, which is illustrated as an OPC.NET server, in the same computing or processing device within a process control network, such as a server device having a processor and memory. The OPC.NET server 200 may be a standard, off-the-shelf, OPC.NET server that provides access to OPC.NET clients 210 implemented in client devices. Such a server may have four ports or logical endpoints including a read endpoint, a write endpoint, a configure endpoint and a publish endpoint which are essentially implemented as WCF endpoints that control TCP communications to and from the server 200. As is known, the read endpoint accepts read requests to perform reads within the process control network 10, the write endpoint accepts write requests (e.g. from a DMZ gateway device) to perform writes within the process control network 10, the configuration endpoint supports browse requests and also enables the external data server 200 to be configured by a configuration engine such as the OPC.NET resource manager 215, and the publish endpoint enables the external data server 200 to publish data in a regular or periodic or other preconfigured manner. Of course, the read, write, configure and publish endpoints can be set up or established within the data server 200 in any desired manner and can be implemented as, for example, requests, ports, logical or physical endpoints, etc. However, in the server 200 of FIG. 2, the read and write endpoints are disabled through on-site initialization of the server 200 and the configuration endpoint is only accessible within the process control network 10 by the configuration engine 215.

More particularly, the configuration engine 215 which is, in this example, an OPC.NET DMZ resource manager, configures the OPC.NET server 200 to publish one or more "data views" containing data or events/alarms or other process plant data. Such data views are illustrated in FIG. 2 as the views 220 stored in the external data server 200. The definition of each data view 220 may be customized to the needs of the installation, which often reflects the data/events/alarms shown on workstation displays, such as faceplates or alarm lists. Of course, the data views 220 can be configured or set up to provide any desired process control information from within the process control network 10, such as any process control information from the data or event historian 12 (of FIG. 1), the controllers 11, the field devices or other devices 15-22, and 60-72, the workstations 13, etc. within the process control network 10 of FIG. 1. Such process control information may include but is not limited to control information, device information, maintenance information, configuration information, etc. More particularly, control information may include measured, simulated or otherwise determined process variable information, such as flows, pressures, levels, temperatures, etc. Such information may also include control signals, controller configuration and tuning variables, control settings, alarms and alerts, etc. Still further, device information may include device names, manufacturers, serial numbers, tags, calibration information or any other information about a device. Maintenance information may include device or control routine calibration information, repair information, device alarms or alerts, user or maintenance logs, etc. Likewise, configuration information may include device and/or control configuration information for items such as control and plant hierarchies, flow diagrams, piping and instrument diagrams (PI&Ds), etc. Of course, the process control information may be any information about the control routines, function blocks, devices, communications, etc. illustrated or described with respect to the process control network 10 of FIG. 1.

In any event, once the data views 220 are configured within the external data server 200, the OPC.NET server 200 publishes data to one or more OPC.NET DMZ gateways 206 according to or as defined by these data views 220. In this case, the server 200 accesses or obtains the data described or defined by the data views 220 from the process control network 10 and publishes this data to the gateway device(s) 206 using a format specified by or associated with the data view 220. In addition, properties on the server 200 may be set during server initialization to identify the OPC.NET DMZ gateway(s) 206 as the only authorized remote application(s) (outside the process control network 10) that are to receive published data defined by the data views 220.

Still further, to allow the OPC.NET DMZ gateway 206 to receive published data using OPC.NET requests, the OPC.NET DMZ resource manager (i.e., the configuration engine 215) exports a file that contains a configuration identifier for a set of (one or more) data views 220 and also describes each data view and its data items/events/alarms. Such files are illustrated in FIG. 2 as files 222. If more than one set of data views is required, the OPC.NET DMZ resource manager 215 may create additional configurations, which it also exports to files within the DMZ gateway device(s) 206. It will be understood that different ones of the gateway devices 206 may be configured to receive or subscribe to the same or different ones of the data views 220, and thus each gateway device 206 may have its own set of files 222 corresponding to a subset of the total set of data views 220.

The exported data view files 222 are of course made available to the OPC.NET DMZ gateway devices 206 through a secure mechanism, which the OPC.NET DMZ gateway 206 uses to receive and interpret data published by the OPC.NET server 200. If more than one OPC.NET DMZ gateway 206 exists, each exported configuration file can be optionally securely distributed to only specific OPC.NET DMZ gateways 206, thus further restricting access to control system data/events/alarms. In any event, as will be understood, the configuration engine 215, i.e., the OPC.NET DMZ resource manager, configures the OPC server 200 to only be able to publish one or more preset or pre-established data views and also configures the data views 220 to include preset or pre-established data obtained from the process control network 10. The resource manager or configuration engine 215 also provides the exported data view files 222, including a description of the data within the data views 220, to the gateway devices 206 to enable the ultimate client devices or client applications 210 within the client devices to display and use the process control data within the data views 220.

During configuration or set up, each OPC.NET gateway device 206 republishes its data view file 222 and creates a similar export file to be used by various OPC.NET DMZ subscribers (i.e., the client applications 210) to receive and interpret the published data/events/alarms within the data views 222. In this manner, the OPC.NET DMZ subscribers 210 have limited ability to infect the OPC.NET DMZ gateway device 206. Similarly, even if infected, the OPC.NET DMZ gateway device 206 has little chance to infect the OPC.NET server 200 because the gateway device 206 cannot issue requests (commands), such as reads and writes to the server 200 and cannot perform any configuration activities with respect to the server 200.

Thus, as configured, the external data server 200 is only able to respond locally to a configuration engine (within the process control network 10) and to only publish data to external devices (i.e., devices outside of the process control network or devices on the external network 102). As such, the external data server 200 has no ability to receive externally generated read and write commands and thus is not subject to attack by malware or other processes within the DMZ gateway devices 206 using these commands. Moreover, the external data server 200 is protected or is more secured because the traditional OPC.NET client is separated into two separate entities including the DMZ resource manager or configuration engine 215, which is implemented within the process control network 10, and the OPC.NET DMZ gateway 206 which is implemented outside of the process control network 10. Still further, this configuration set-up removes the ability of the OPC.NET DMZ gateway devices 206 to send OPC.NET resource management (configuration), read, and write requests to the OPC.NET server 200, thereby decreasing the attack surface of the OPC.NET server 200. Moreover, this configuration enables the OPC.NET DMZ gateway devices 206 to receive OPC.NET data/events/alarms from the OPC.NET server 200 without establishing a typical OPC client/server connection to the OPC.NET server 200. Instead, the OPC.NET DMZ gateway devices 206 are only able to receive published data that is pre-defined by data views created by or using the resource manager 215. In a similar manner, this configuration removes the ability of the OPC.NET DMZ subscribers or clients 210 to send OPC.NET resource management (configuration), read, and write requests to the OPC.NET DMZ gateways 206, because the client applications 210 are also limited to only receiving published data views by the OPC.NET gateway devices 206. In fact, in this configuration, the OPC.NET DMZ subscribers or clients 210 are only able to receive OPC.NET data/events/alarms from the OPC.NET DMZ gateway devices 206 via the publication of data views by the gateway 206, and without establishing a typical OPC client/server connection to the OPC.NET DMZ gateway devices 206. As a result, of this configuration, three coordinated, yet separate layers of access protection are implemented to protect control system data/events/alarms.

If desired, the configuration engine 215 (or resource manager) may enable or provide granularity of access to the data views by providing multiple configurations of data views and through the use of multiple DMZ gateways 206. In this case, each gateway device 206 may be configured to receive (subscribe to) and republish one or more specific data views. The client applications 210 within the client devices may then subscribe to (be configured to receive) all of the republished data views as published by a particular gateway device 206 or to receive specific data views of particular gateways 206. This feature enables each client application 210 to select the particular process control data (as defined by the available data views) that the client application 210 would like to receive and use (e.g., display to a user, process in some manner, etc.)

While the security techniques described herein have been described as being used in conjunction with networked process control devices and systems using Ethernet and various known process control protocols, such as Fieldbus, HART and standard 4-20 ma protocols, the security techniques described herein can, of course, be implemented in any type of control device using any other process control communication protocol or programming environment and may be used with any other types of devices, function blocks or controllers. Although the security features described herein are preferably implemented in software, they may be implemented in hardware, firmware, etc., and may be executed by any other processor associated with a computer device. Thus, the methods described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A communication system, comprising:
 a process control network including a plurality of process control devices communicatively connected together;
 an external data server disposed within the process control network;
 an external communications network disposed outside of the process control network;
 a gateway device communicatively coupled between the external data server and the external communications network, wherein the gateway device (i) is disposed outside the process control network and (ii) is disposed outside the external communications network; and
 a configuration application stored on a computer memory within a device within the process control network, that executes on a processor within the device within the process control network to configure the external data server to publish data to the external communications network according to one or more data views, wherein each of the one or more data views defines a set of process control data to be published and wherein the external data server is configured to be unable to respond to read calls from the gateway device or the external communications network.

2. The communication system of claim 1, wherein the configuration application further executes on the processor within the device within the process control network to configure the external data server to include data view files specifying the data within one or more data views and to publish the data view files to the gateway device connected to the external communications network.

3. The communication system of claim 1, wherein the external data server is configured to be unable to respond to write calls from the gateway device.

4. The communication system of claim 1, wherein the external data server is configured to be unable to respond to configuration calls from the gateway device.

5. The communication system of claim 1, wherein one of the one or more data views specifies a set of process control data generated or collected by one or more process controllers within the process control network.

6. The communication system of claim 1, wherein one of the one or more data views specifies process control data generated or collected by one or more field devices within the process control network.

7. The communication system of claim 1, wherein one of the one or more data views specifies process control configuration data stored in a memory of a further device within the process control network.

8. The communication system of claim 1, wherein one of the one or more data views specifies maintenance data about one or more process control devices within the process control network.

9. The communication system of claim 1, wherein the configuration application executes to configure the external data server to periodically publish data according to the one or more data views.

10. The communication system of claim 1, wherein the external data server conforms to the OPC protocol.

11. The communication system of claim 1, wherein the external data server is configured to receive and act upon configuration commands only from devices within the process control network.

12. The communication system of claim 1, wherein the configuration application is stored and executed within the external data server.

13. The communication system of claim 1, further including a data or event historian disposed within the process control network and wherein the external data server obtains some of the process control data defined by the one or more data views from the data or event historian.

14. The communication system of claim 1, wherein the gateway device includes a firewall.

15. The communication system of claim 1, wherein the gateway device is configured to republish data according to the one or more data views as received from the external data server to one or more client applications on the external communications network.

16. The communication system of claim 1, wherein the gateway device is configured to be unable to execute read or write or configuration calls to the external data server.

17. A communication system, comprising:
a process control network including a plurality of process control devices communicatively connected together;
an external data server disposed within the process control network;
an external communications network disposed outside of the process control network; and
a gateway device communicatively coupled between the external data server and the external communications network, wherein the gateway device (i) is disposed outside the process control network and (ii) is disposed outside the external communications network,
and wherein the external data server is configured to be unable to respond to read or write calls from the gateway device or the external communications network, and,
wherein the external data server stores one or more data view files and executes to publish data to the gateway device according to one or more data view files, wherein each of the one or more data view files defines a set of process control data from within the process control network to be published and wherein the gateway device stores a set of further data view files defining data to be received from the external data server via publications from the external data server and the gateway device is configured to republish data to one or more client applications connected to the external communications network using the set of further data view files.

18. The communication system of claim 17, wherein the external data server periodically publishes data to the gateway device according to the one or more data view files.

19. The communication system of claim 17, further including a configuration application stored within a device within the process control network that executes to configure the external data server to store the one or more data view files.

20. The communication system of claim 19, wherein the configuration application is stored in the external data server.

21. The communication system of claim 17, wherein the gateway device stores the one or more further data view files.

22. The communication system of claim 17, wherein the gateway device includes a firewall disposed between the external data server and the external communications network.

23. The communication system of claim 17, wherein the gateway device is configured to be unable to send read or write calls to the external data server.

24. The communication system of claim 17, wherein the external data server is configured to only respond to configuration commands from a source within the process control network.

25. The communication system of claim 17, wherein the external data server is configured to obtain data defined by the one or more data views via the process control network.

26. A method of securely providing information from a process control network to an external communications network in a system having an external data server coupled within the process control network and that is communicatively connected to a gateway device that is connected to the external communications network, comprising:
storing one or more data view files in the external data server, wherein each data view file specifies a set of process control data to be regularly published to the external communications network;

configuring the external data server to communicate with the gateway device using data publish signals, wherein the gateway device (i) is disposed outside the process control network and (ii) is disposed outside the external communications network;

configuring the external data server to automatically publish process control data specified by the one or more data view files to the gateway device; and preventing the external data server from responding to read, write and configuration commands from the gateway device or the external communications network.

27. The method of claim 26, further including causing the gateway device to republish the process control data sent to the gateway device by the external data server to one or more client applications on the external communications network.

28. The method of claim 27, further including storing further data view files at the gateway device defining the process control data to be received from the external data server via data publish signals and to be republished to the one or more client applications.

29. The method of claim 27, further including providing the one or more client applications with an option to subscribe to the process control data republished by the gateway device.

30. The method of claim 26, further including storing a configuration application within a device within the process control network and using the configuration application to configure the external data server to publish the process control data specified by the one or more data view files.

31. The method of claim 30, further including configuring the gateway device to republish the process control data to one or more client applications.

32. The method of claim 30, wherein storing the configuration application includes storing the configuration application in a different device on the process control network than the external data server.

33. The method of claim 26, wherein causing the external data server to automatically publish process control data specified by the one or more data view files to the gateway device includes causing the external data server to obtain the process control data specified by the one or more data view files from the process control network and to periodically send the obtained process control data to the gateway device.

34. The method of claim 26, further including configuring the external data server to be only able to implement configuration commands received from a device within the process control network.

35. The method of claim 26, further including configuring the gateway device to be unable to implement read and write calls to the external data server in response to commands received from one or more client applications on the external communications network.

36. The method of claim 30, wherein the device is the external data server.

37. A communication system for securely providing communications from a process control network to a client device outside of the process control network, the communication system comprising:

an external data server disposed within the process control network, wherein the process control network includes a plurality of process control devices communicatively connected together, the external data server configured to publish process control data generated by the plurality of process control devices;

a gateway device communicatively coupled between the external data server and the client device and via which at least some of the process control data published by the external data server is delivered to the client device, wherein the gateway device (i) is disposed outside the process control network and (ii) is disposed outside an external communications network; and at least one of: a first security mechanism that prevents the gateway device from issuing commands to the external data server or the external communications network, or a second security mechanism that prevents the client device from issuing commands to the gateway device.

38. A method for securely providing communications from a process control network to a client device outside of the process control network, the method comprising:

generating process control data by a plurality of process control devices of the process control network;

publishing the process control data to the client device, wherein the process control data is published by an external data server through a gateway device, the gateway device communicatively coupled between the external data server and the client device, wherein the gateway device (i) is disposed outside the process control network and (ii) is disposed outside an external communications network; and preventing commands from being issued to at least one of: the external data server from the gateway device or the external communications network, or the gateway device from the client device.

* * * * *